(12) United States Patent
Bartek et al.

(10) Patent No.: US 6,444,931 B1
(45) Date of Patent: Sep. 3, 2002

(54) MODULAR CIRCUIT BREAKER HOUSING ASSEMBLY

(75) Inventors: David A. Bartek, Plano; Marcus L. Melane, Irving; Edward D. Johnson, Plano, all of TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/702,780

(22) Filed: Oct. 31, 2000

(51) Int. Cl.$^7$ .................................................. H02B 1/26
(52) U.S. Cl. ...................................... 200/307; 439/716
(58) Field of Search ................................ 439/715, 716; 200/307

(56) References Cited

U.S. PATENT DOCUMENTS

| | | | | |
|---|---|---|---|---|
| 3,702,457 A | * | 11/1972 | Fujita | 439/717 X |
| 4,190,749 A | * | 2/1980 | Erickson et al. | 200/307 X |
| 4,542,953 A | * | 9/1985 | Iwamoto et al. | 439/717 |
| 5,451,729 A | * | 9/1995 | Onderka et al. | 200/307 X |

* cited by examiner

*Primary Examiner*—Renee Luebke
(74) *Attorney, Agent, or Firm*—Danamraj & Youst, P.C.; Richard A. Mysliwiec; V. Lawrence Sevell

(57) ABSTRACT

A customizable, modular circuit breaker housing assembly having an optimized compact form factor for use with electrical and telecommunications equipment. The housing assembly is comprised of an interlocked arrangement of individual housing portions coupled at one end to an end housing portion, and to an end panel portion at an opposite end. The end housing portion and individual housing portions include a load bus chamber and a line bus chamber for receiving load and line bus members, and one or more alarm contact member receptacles for receiving at least one alarm contact member. The line bus member and the alarm contact members may be provided as individually segmented members. In other embodiments, the individual housing portions may include pass-through slots for inserting a common line bus bar, pass-through apertures for common contact members, or both. The line and load bus members are formed of extruded metallic members having substantially the same cross-sectional surface. Mounting devices are provided on the end housing and individual housing portions for coupling the modular circuit breaker assembly to a mounting panel of the equipment.

14 Claims, 15 Drawing Sheets

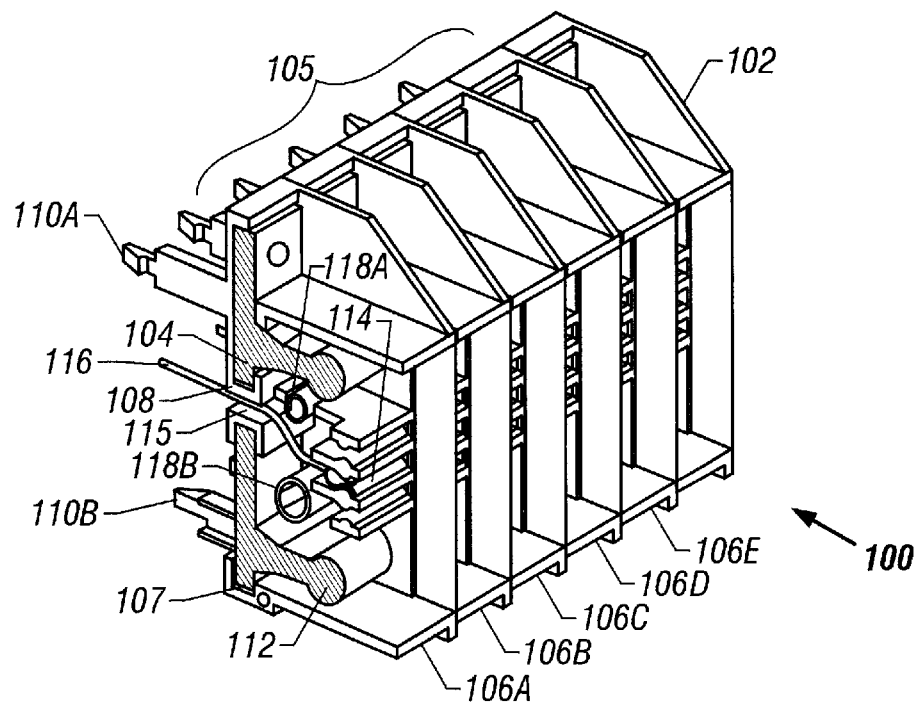
FIG. 1
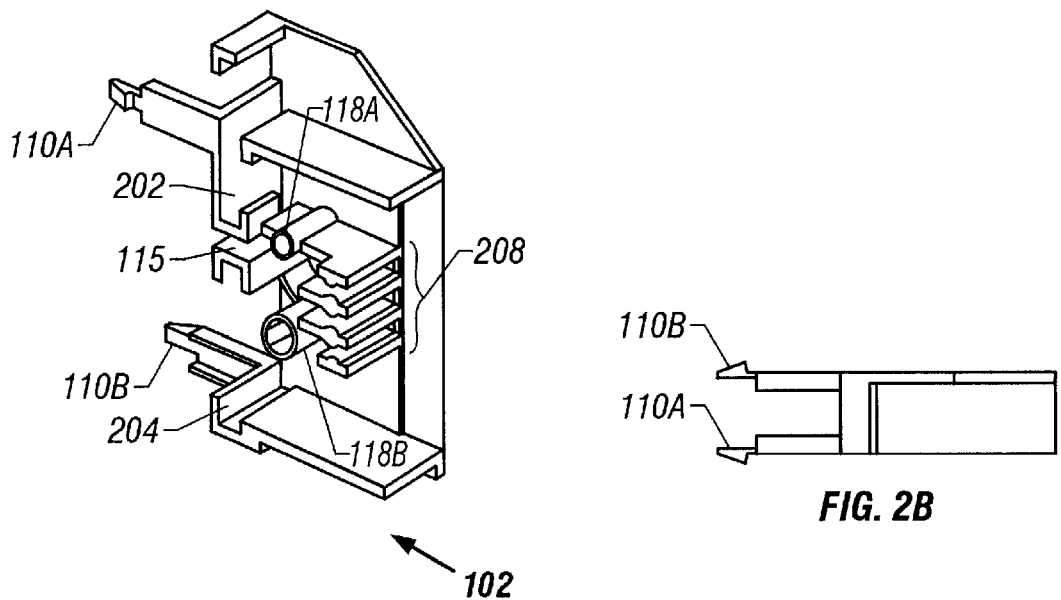
FIG. 2A
FIG. 2B

MODULAR CIRCUIT BREAKER HOUSING ASSEMBLY

BACKGROUND OF THE INVENTION

1. Technical Field of the Invention

The present invention generally relates to circuit breaker housings. More particularly, and not by way of any limitation, the present invention relates to a customizable, modular circuit breaker housing assembly with compact form factor for use with telecommunications equipment and other electrical equipment.

2. Description of Related Art

A common requirement of electrical equipment, including telecommunications equipment, is that the components thereof be standardized yet be customizable or configurable with relative ease for accommodating various field applications, customer-specific arrangements, et cetera. This is especially true with respect to mass-produced components such as, e.g., circuit breakers, circuit breaker housings, etc. used for protecting the equipment.

Another requirement of today's densely populated rack-mountable equipment is form factor compliance. Because of ever-increasing demand for better performance, improved capacities and capabilities, and the concomitant increase in the complexity of equipment design, space has become a precious resource that needs to be optimized in every possible way. Stringent form factor constraints exist, accordingly, with respect to almost all components of the equipment.

It is well known that modularization and component-level integration have been effective for addressing overall equipment-related form factor requirements. It is also well known, however, that unless the individual components are also of an optimum form factor, such approaches as component-level integration may not be feasible or may be sub-optimal only. In the field of equipment power distribution and circuit protection, for example, there exists a need to integrate components such as power distribution panels (PDPs), universal fuse alarm panels (UFAPs), universal fuse power panels (UFPPs), etc. into a single Integrated Power Assembly (IPA) or Integrated Power Distribution Panel (IPDP). However, the existing circuit breaker housing modules are too large, less economical, or both, for integrating such components effectively. Furthermore, as circuit breakers become bulkier to include bus bars (rigid conductors serving as a connection for two or more circuits) that are capable of operating at sufficient ampacity, design constraints are being imposed on the circuit breaker housing modules resulting in even larger sizes in order to accommodate bus routing. Thus, while the conventional circuit breakers are typically about 4 in. in height, the housing modules are often 6 to 9 in. or more. Those skilled in the art should appreciate, accordingly, that in the rack-mountable equipment, such an increase in the vertical height gives rise to less rack space (or fewer racks) for the components with core functionality.

In addition to being less space-efficient, the current circuit breaker housing modules do not provide ergonomic accessibility to the cable connections associated therewith. Because the breaker modules are typically provided at the back of the equipment cabinet to accommodate the size, the connections are accessible from the rear only. Accessing the breakers or breaker housings for maintenance, repair, replacement, upgrades, etc. is rather cumbersome, giving rise to increased downtime. Moreover, the conventional circuit breaker housing modules are not connectorized for grouping multiple modules into assemblies and for grouping multiple assemblies together in order to provide customizable expandability.

SUMMARY OF THE INVENTION

Accordingly, the present invention advantageously provides a highly customizable, modular circuit breaker housing assembly that is adaptable for numerous applications including, for example, telecommunications equipment, residential and light commercial applications, et cetera, yet is comprised of an optimized compact form factor that provides considerable space savings. Because of the compact form factor realized, the modular circuit breaker housing assembly makes it possible to consolidate existing PDPs, UFAPs, UFPPs, etc. into a single Integrated Power Assembly (IPA) or Integrated Power Distribution Panel (IPDP). Also, the circuit breaker housing assembly of the present invention provides front access cable connections for better accessibility.

The housing assembly is preferably comprised of an interlocked arrangement of individual housing portions coupled at one end to an end housing portion, and to an end panel portion at an opposite end. The end housing and end panel portions, and the individual housing portions are preferably formed of injection-molded plastics. Each of the end housing and individual housing portions includes a load bus chamber and a line bus chamber for receiving or accepting load and line bus members, and one or more alarm contact member receptacles for receiving at least one alarm contact member.

In an exemplary embodiment of the present invention, the line bus member and the alarm contact members may be provided as individually segmented members, wherein each housing portion houses separate line and load bus members and alarm contact members. In other exemplary embodiments, the individual housing portions may include pass-through slots for inserting a common line bus bar, pass-through apertures for common contact members, or both.

Preferably, the line and load bus members are formed of extruded metallic members (e.g., copper bars, aluminum bars with a nickel plating, etc.) having substantially the same cross-sectional surface. Mounting snaps are provided on the end housing and individual housing portions for coupling the modular circuit breaker assembly to a mounting panel of the equipment.

In another aspect, the present invention is directed to a method of assembling a customizable modular circuit breaker housing assembly for telecommunications equipment. An end housing portion having interiorly thereto a load bus chamber and a line bus chamber is provided, wherein the end housing portion includes at least one interlocking receptacle formed therein. A load bus member and a common line bus bar are installed in the respective chambers formed in the end housing portion. Preferably, at least one common alarm contact member is also installed in the end housing portion. Thereafter, a plurality of individual housing portions are installed, wherein the individual housing portions interlock with each other by means of interlocking connectors and interlocking connector receptacles formed on each individual housing portion. Each individual housing portion is provided with an individual load bus chamber for placing an individual load bus member therein and a line bus chamber with a pass-through slot for placing the common line bus bar. Also, the individual housing portions further include at least one pass-through aperture for accepting an alarm contact member. A first terminal individual housing portion couples to the end housing portion. The modular circuit breaker housing assembly is enclosed at the other end by coupling an end panel portion having at least one interlocking member formed thereon to a second terminal individual housing portion of the plurality of individual housing portions.

BRIEF DESCRIPTION OF THE DRAWINGS

A more complete understanding of the present invention may be had by reference to the following Detailed Description when taken in conjunction with the accompanying drawings wherein:

FIG. 1 is a perspective view of an exemplary embodiment of a modular circuit breaker housing assembly provided in accordance with the teachings of the present invention;

FIGS. 2A–2E depict several views of an exemplary end housing portion of the modular circuit breaker housing assembly depicted in FIG. 1;

DETAILED DESCRIPTION OF THE DRAWINGS

Figure 2C:
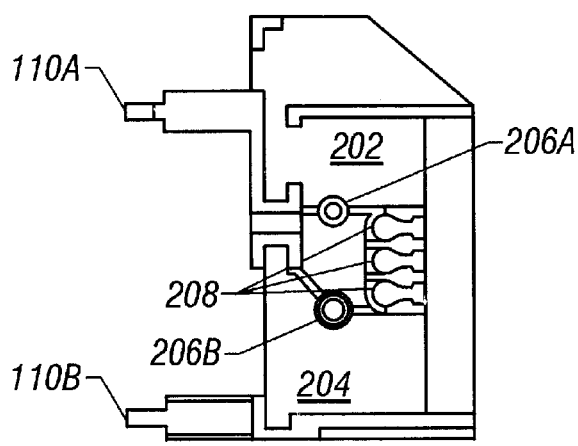

In the drawings, like or similar elements are designated with identical reference numerals throughout the several views thereof, and the various elements depicted are not necessarily drawn to scale. Referring now to FIG. 1, depicted therein is a perspective view of an exemplary embodiment of a modular circuit breaker housing assembly 100 provided in accordance with the teachings of the present invention for accepting a plurality of standardized, compact circuit breakers (not shown). The exemplary circuit breaker housing assembly 100 is preferably comprised of an interlocking arrangement 105 of individual housing portions (e.g., housing portions 106A through 106E) coupled at one end (i.e., first terminal individual housing portion 106E) to an end housing portion 102, and to an end panel portion (not shown in this FIG.) at an opposite end (i.e., second terminal individual housing portion 106A). Whereas the end housing and end panel portions, and the exemplary embodiments of the individual housing portions, which are preferably formed of injection-molded plastics, will be individually described in greater detail hereinbelow, the individual housing portion 106A is particularly set forth immediately below with respect to the perspective view shown in FIG. 1.

Preferably, at least one load bus chamber 108 and at least one line bus chamber 107 are formed in the individual housing portion 106A for receiving a load bus member 104 and a line bus member 112, respectively. Also, one or more alarm contact member receptacles (not explicitly labeled in this FIG.) are included in the individual housing portion 106A for accepting at least one alarm contact member 114 to which an alarm cable 116 is coupled by means of a via 115 formed in the individual housing portion.

In the presently preferred exemplary embodiment of the present invention, the load bus member 104 is provided as a small metallic segment housed in the load bus chamber of an individual housing portion (e.g., housing portion 106A). As those skilled in the art should readily appreciate, the load bus member 104 is operable to provide load current to a circuit portion disposed in the equipment (not shown). Further, as will be described in greater detail hereinbelow, the line bus member 112 (operable to carry incoming line current) and the alarm contact members (e.g., alarm contact member 114) may be provided as individually segmented members or as common elongated members wherein each individual housing portion includes pass-through slots for inserting a common line bus bar, pass-through apertures for common alarm contact members, or both.

Preferably, the load and line bus members 104, 112 are formed of extruded metallic members (e.g., copper bars, aluminum bars with a nickel plating, etc.) having substantially the same cross-sectional surface and may be cut into individual segments if necessary. It should be appreciated that since a single extrusion tool may be used to fabricate both line and load bus members, considerable savings in the cost of manufacture may be advantageously realized.

One or more interlocking connector receptacles (such as, for example, gripper bosses 118A and 118B) are provided on one side of the individual housing portion 106A. One or more interlocking connectors (e.g., gripper pins, not shown in this FIG.) are disposed on the opposite side of the individual housing portion 106A. By means of the interlocking connectors and receptacles, the individual housing portions are sequentially interlocked together to form the arrangement 105.

The end housing and individual housing portions are provided with suitable mounting means such as, e.g., snaps, screws, rivets, bolts, clasps, fasteners, hooks, clips, braces, grips, clamps, buckles, buttons, et cetera, for mounting the modular circuit breaker housing assembly 100 to a mounting panel of the equipment. Reference numerals 110A and 110B exemplify a pair of snaps that are particularly advantageous for easy installation without any special tools.

FIGS. 2A through 2E depict several views of an exemplary end housing portion 102 of the modular circuit breaker assembly 100 described hereinabove. FIG. 2A depicts a perspective view of the exemplary end housing portion 102 in particular detail. One or more alarm contact member receptacles 208 are formed interior to the end housing portion 102 which are operable to receive either segmented or common alarm contact members (not shown in this FIG.). A load bus chamber 202 and a line bus chamber 204 (similar to the load bus and line bus chambers 108, 107 described above) are also formed interior to the. end housing portion 102 for accepting load bus and line bus members. Interlocking gripper bosses 118A and 118B are formed in the end housing portion 102 for accepting the gripper pins of a first terminal individual housing portion such as the individual housing portion 106E exemplified in FIG. 1. As alluded to in the foregoing, mounting snaps 110A and 110B are provided for mounting the modular circuit breaker housing assembly formed with the end housing portion 102 to a mounting panel (not shown).

Figure 2D:
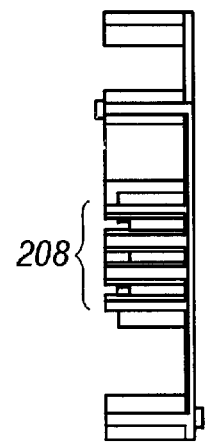
Figure 2E:
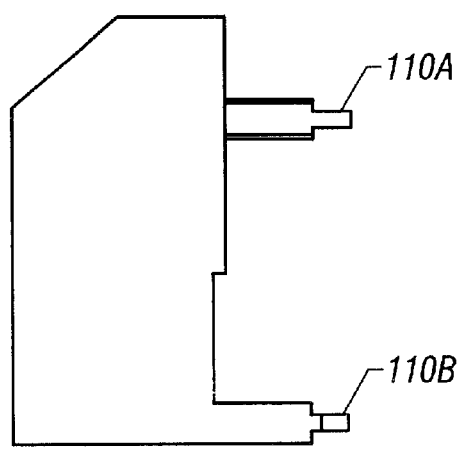

FIG. 2B depicts a top view of the end housing portion 102. FIGS. 2C, 2D and 2E depict a left side view, front view, and a right side view of the end housing portion 102, respectively. These additional views provide essentially the same features of the end housing portion 102 as described in the foregoing.

Figure 3A:
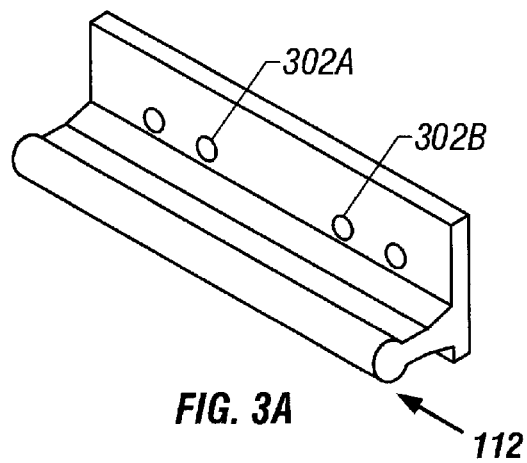
FIGS. 3A–3E depict several views of an exemplary common line bus member for use in the modular circuit breaker housing assembly depicted in FIG. 1.
Figure 3B:
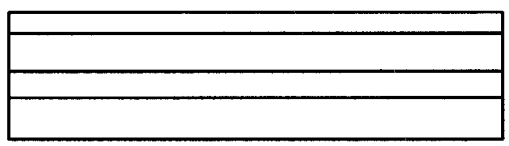
Figure 4A:
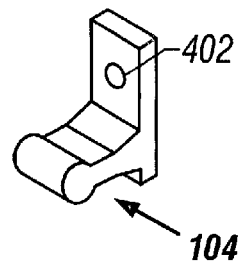
FIGS. 4A–4E depict several views of an exemplary load bus member for use in the modular circuit breaker housing assembly depicted in FIG. 1.
Figure 3C:
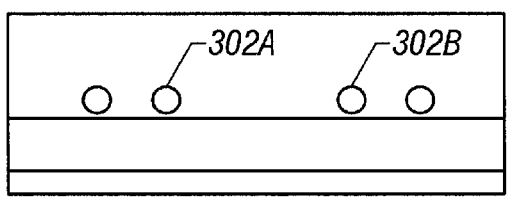
Figure 3D:
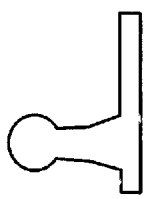
Figure 3E:
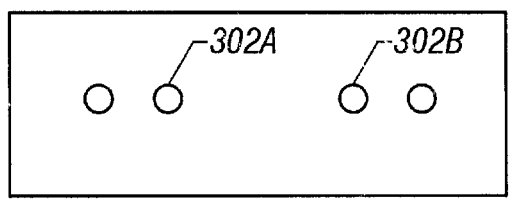

FIGS. 3A through 3E depict several views of an exemplary common line bus member (also referred to as a line bus bar) such as the line bus member 112 described above. A plurality of holes (e.g., holes 302A and 302B) are formed (e.g., drilled and tapped) in the rear vertical section of the bus bar 112 for cable and/or jumper attachment with another modular circuit breaker housing assembly. Those skilled in the art should appreciate that the cable/jumper attachment is advantageous where multiple housing assemblies are required to be connected together for expandable circuit breaker designs. FIG. 3B depicts a top view of the line bus member. FIGS. 3C, 3D, and 3E depict a left side view, front view (showing the cross-section), and a right side view of the line bus member 112, respectively. Where segmented line bus members are used in the end housing and individual housing portions, the line bus bar may be cut to length in order to fit the line bus chambers thereof.

Referring now to FIGS. 4A through 4E, depicted therein are several views of an exemplary load bus member (also referred to as a load contact) such as the load bus member 104 described above. A perspective view of the load bus member 104 is provided in FIG. 4A. As alluded to hereinbefore, both the load and line bus members are preferably provided with the same cross-sectional surface and thus may be manufactured from the same extrusion tool. An extruded bar may be cut to length into individual load bus members which are dimensioned to be placed in the load bus chambers of the end housing and individual housing portions. Preferably, at least one hole 402 is provided in the rear vertical section of the load bus member 104 for attaching a cable which carries load current to be distributed to an individual circuit portion. In presently preferred embodiments, both the load and line bus members are dimensioned to carry approximately 100 to 120 A of current.

Figure 4B:
Figure 4C:
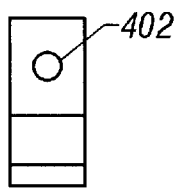
Figure 4D:
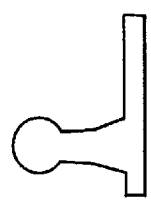
Figure 4E:
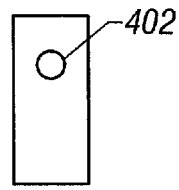

FIG. 4B depicts a top view of the load bus member 104. FIGS. 4C, 4D, and 4E depict a left side view, front view (showing the cross-section), and a right side view of the load bus member 104, respectively.

FIGS. 5A through 5E depict several views of an exemplary common alarm contact member 114. Preferably, the alarm contact members are manufactured from thin sheet metal stampings which are cut to fit the end and individual housing portions (in the segmented alarm contact implementation), or dimensioned to span the whole modular housing assembly (in the common alarm contact implementation).

In a presently preferred exemplary embodiment, the alarm contact member 114 is provided with spaced notches (e.g., reference numerals 502A and 502B). When installed in the modular circuit breaker housing assembly, the alarm contact members operate as tight clasp receptacles into which individual circuit breaker's alarm contact pins may be inserted. Electrical contact is provided with individual alarm cables (not shown) which may be attached to the alarm contact members via holes provided therein. Reference numerals 504A and 504B shown in a rear view (FIG. 5E) of the alarm contact member 114 exemplify two such holes.

Figure 5A:
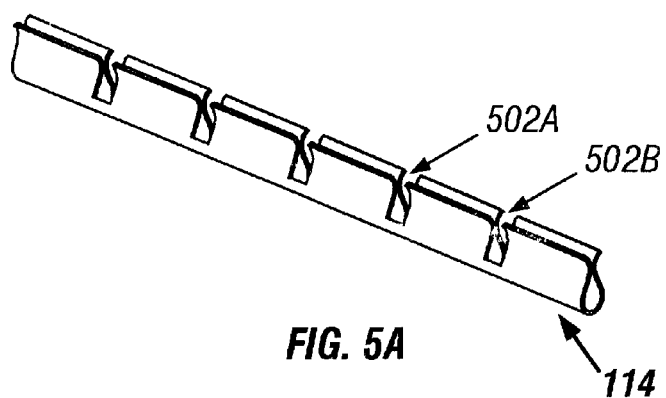
FIGS. 5A–5E depict several views of an exemplary common alarm contact member for use in the modular circuit breaker housing assembly depicted in FIG. 1.
Figure 5B:
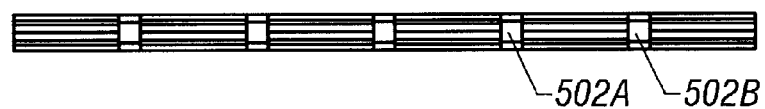
Figure 5C:
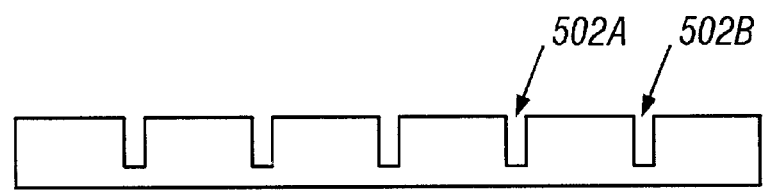
Figure 5D:
Figure 5E:
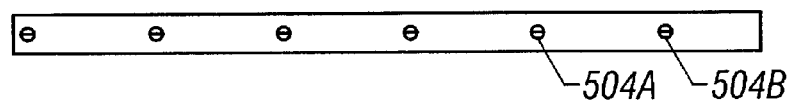

FIG. 5B depicts a top view of the alarm contact member 114. A front view and a side cross-sectional view of the alarm contact member 114 are respectively shown in FIGS. 5C and 5D.

Figure 6A:
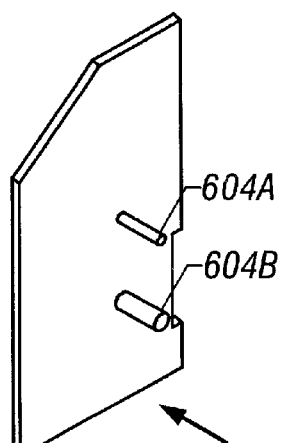
FIGS. 6A–6E depict several views of an end panel portion for enclosing the interlocking individual housing portions of the modular circuit breaker housing assembly depicted in FIG. 1.
Figure 6B:
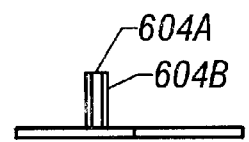
Figure 6C:
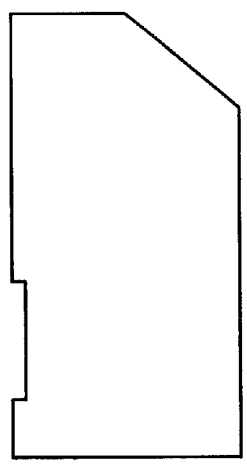
Figure 6D:
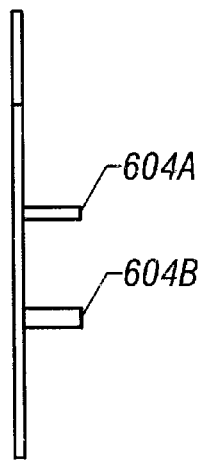
Figure 6E:
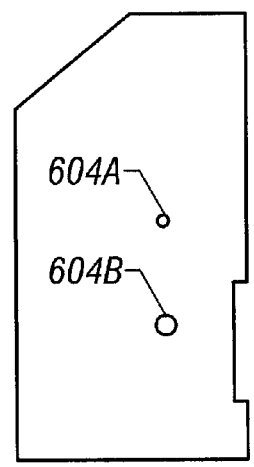

Referring now to FIGS. 6A through 6E, depicted therein are several views of an exemplary end panel portion 602 for enclosing the modular circuit breaker housing assembly of the present invention. FIG. 6A depicts a perspective view of the end panel portion 602 having interlocking connectors (e.g., gripper pins 604A and 604B) for coupling with the terminal individual housing portion having interlocking connector receptacles (e.g., gripper bosses) formed thereon. As alluded to hereinbefore, the end panel portion 603 is preferably formed of injection-molded plastic materials. FIG. 6B shows a top view of the end panel portion 602. FIGS. 6C, 6D, and 6E depict a left side view, front view, and a right side view of the end panel portion 603, respectively.

Figure 7A:
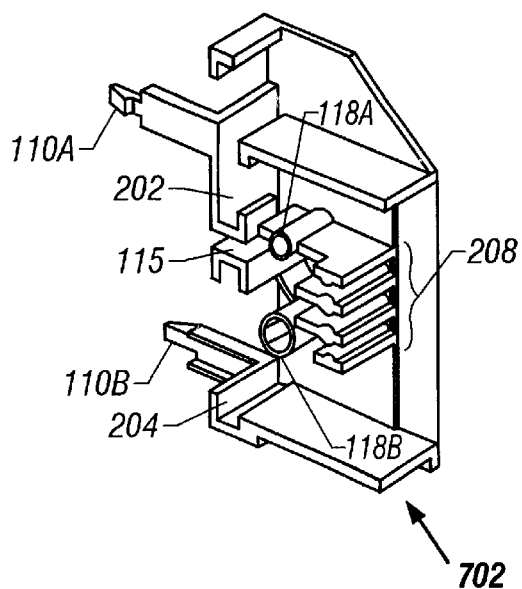
FIGS. 7A–7E depict several views of an exemplary interlocking individual housing portion for use in the modular circuit breaker housing assembly of the present invention, wherein alarm contact members, load bus members, and line bus members are individually segmented.

FIGS. 7A through 7E depict several views of an exemplary interlocking individual housing portion 702 for use in the modular circuit breaker housing assembly of the present invention, wherein alarm contact members, load bus members, and line bus members are individually segmented. FIG. 7A shows a perspective view of the interlocking individual housing portion 702. It should be readily apparent to those skilled in the art that the features of the interlocking individual housing portion 702 are essentially the same as the end housing portion described hereinabove. Accordingly, a detailed description of these features is omitted herein for the sake of brevity and only some of the salient aspects of the interlocking individual housing portion 702 are set forth below.

Figure 7B:
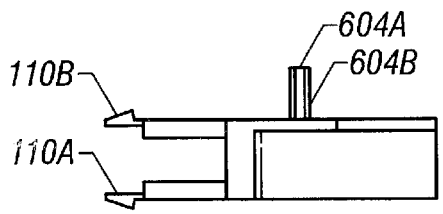
Figure 7C:
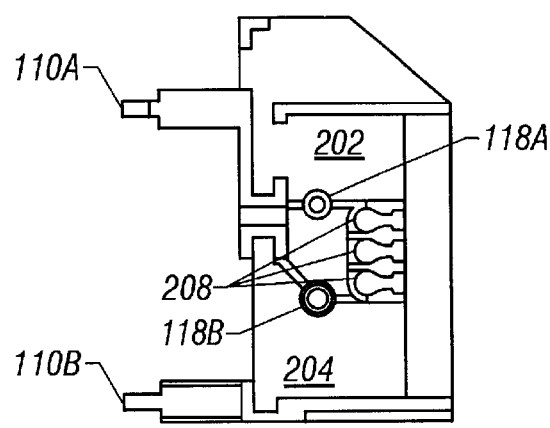
Figure 7D:
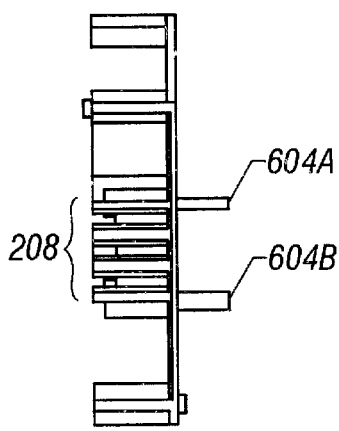
Figure 7E:
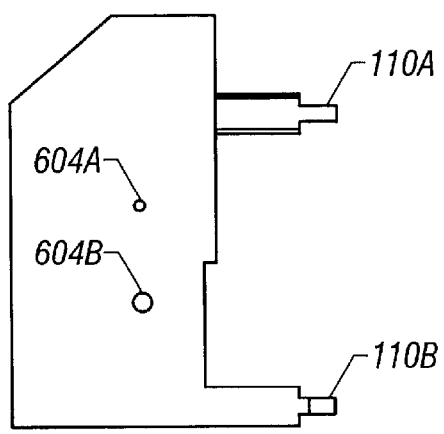
Figure 8A:
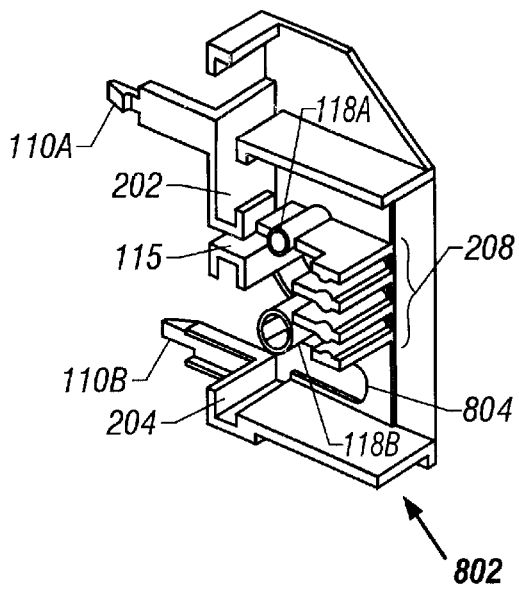
FIGS. 8A–8E depict several views of another exemplary interlocking individual housing portion for use in the modular circuit breaker housing assembly of the present invention, wherein individually segmented alarm contact members and a common line bus member are utilized.
Figure 8B:
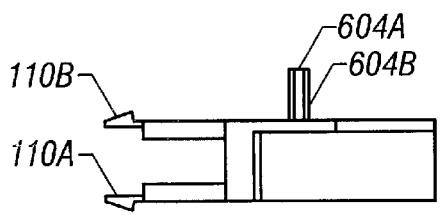
Figure 8C:
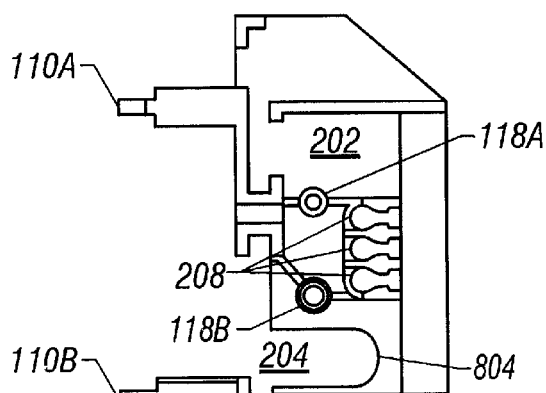
Figure 8D:
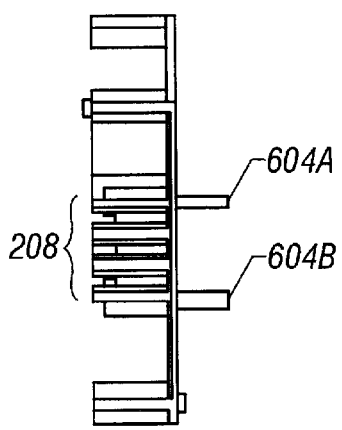
Figure 8E:
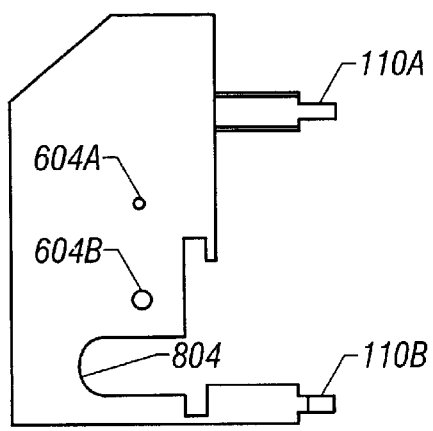

FIG. 7B depicts a top view of the interlocking individual housing portion 702 wherein interlocking connectors 604A and 604B are particularly highlighted. FIG. 7C depicts a first side view of the interlocking individual housing portion which is essentially the same as the corresponding side view of the end housing portion depicted in FIG. 2C. FIGS. 7D and 7E show front and second side views of the interlocking individual housing portion 702 which particularly exemplify the interlocking connectors 604A and 604B for coupling with the interlocking connector receptacles of a preceding individual housing portion or the end housing portion. It should be apparent from the second side view of the interlocking individual housing portion 702 shown in FIG. 7E that no pass-through apertures are provided which would enable the passage of common alarm contact members spanning the entire modular circuit breaker housing assembly.

FIGS. 8A through 8E depict several views of another exemplary interlocking individual housing portion 802 for use in the modular circuit housing assembly of the present invention, wherein individually segmented alarm contact members and a common line bus bar are utilized. As shown in the perspective view (FIG. 8A) of the interlocking individual housing portion 802, a pass-through slot 804 is formed in the body of the housing portion (near the line bus bar chamber 204) which allows the passage of a common line bus bar such as, e.g., line bus bar 112 depicted in, inter alia, FIGS. 3A–3E. The pass-through slot 804 for the common line bus bar is more particularly depicted in the views shown in FIGS. 8C and 8E (first and second side views). As should be apparent from the views depicted in FIGS. 8B and 8D, both top and front views of the individual housing portion 802 are essentially the same as the top and front views of the individual housing portion 702 described hereinabove.

Figure 9A:
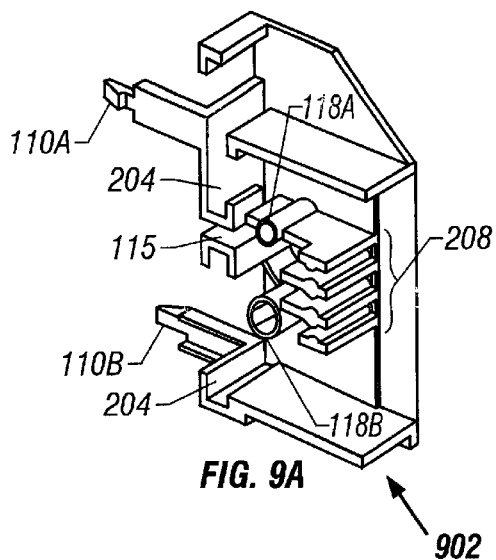
FIGS. 9A–9E depict several views of yet another exemplary interlocking individual housing portion for use in the modular circuit breaker housing assembly of the present invention, wherein individually segmented line bus members and common alarm contact members are utilized.
Figure 9B:
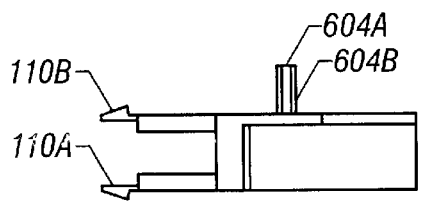
Figure 9C:
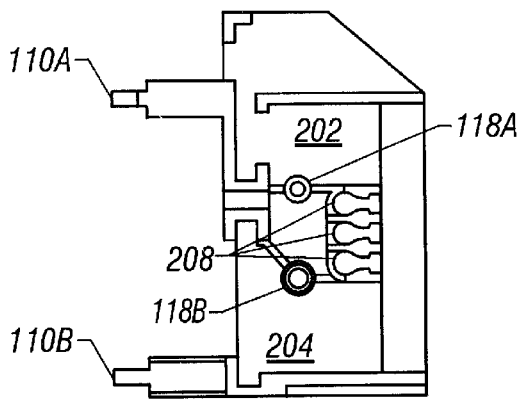
Figure 9D:
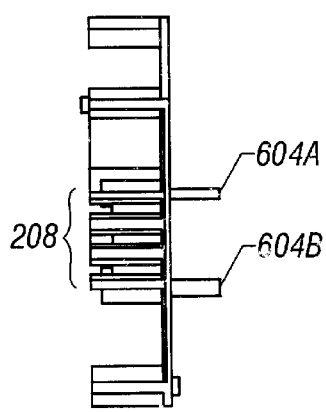
Figure 9E:
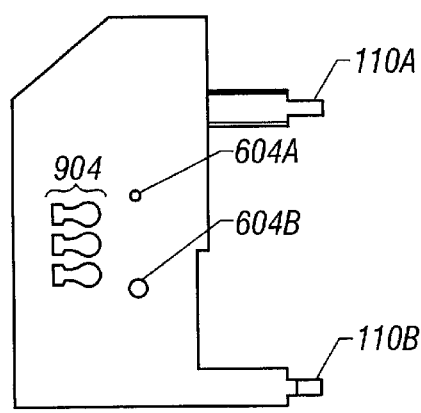
Figure 10A:
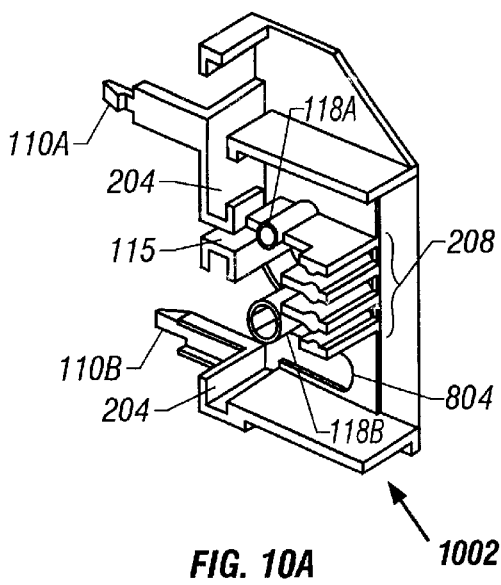
FIGS. 10A–10E depict several views of a still further exemplary interlocking individual housing portion for use in the modular circuit breaker housing assembly of the present invention, wherein a common line bus member is utilized in conjunction with common alarm contact members.
Figure 10B:
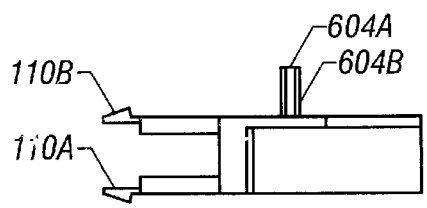
Figure 10C:
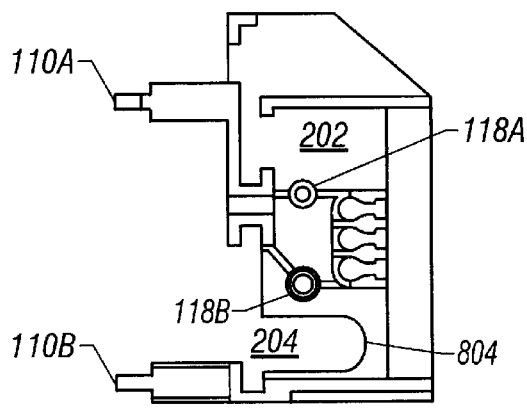
Figure 10D:
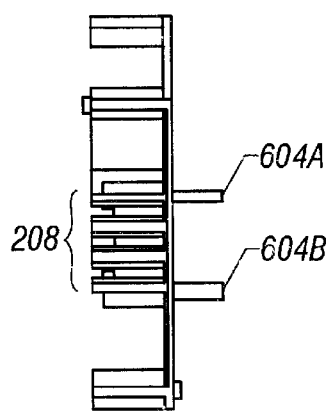
Figure 10E:
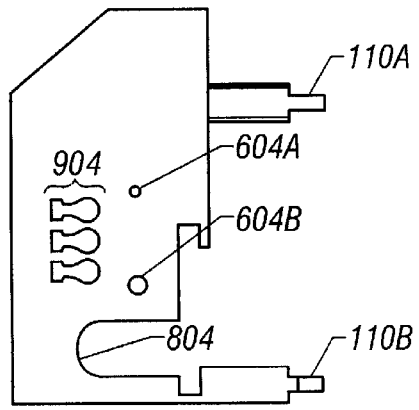

Referring now to FIGS. 9A through 9E, depicted therein are several views of yet another exemplary interlocking individual housing portion 902 for use in the modular circuit breaker housing assembly of the present invention, wherein individually segmented line bus members and common alarm contact members are utilized. While similar to the embodiment depicted in FIGS. 7A–7E, the interlocking individual housing portion 902 here is provided with a plurality of pass-through apertures 904 for allowing the passage of common alarm contact members. FIG. 9E, which depicts a side view of the interlocking individual housing portion 902, particularly exemplifies the pass-through apertures 904. It should be apparent that the remaining views shown in FIGS. 9A–9D highlight the features already described in greater detail hereinbefore.

FIGS. 10A through 10E depict a still further exemplary embodiment of an interlocking individual housing portion 1002 for use in the modular circuit breaker housing assembly of the present invention, wherein a common line bus member (i.e., a line bus bar) is used in conjunction with common alarm contact members. Since both line bus members and alarm contact members are common to the individual housing portions and span the entire modular housing assembly, this particular embodiment includes both pass-through slot 804 (for the common line bus bar) and pass-through apertures 904 (for the common alarm contact members), which may be collectively referred to as pass-through openings. The remaining features of the interlocking individual housing portion 1002 are essentially the same as the features described hereinabove in particular detail.

Figure 11A:
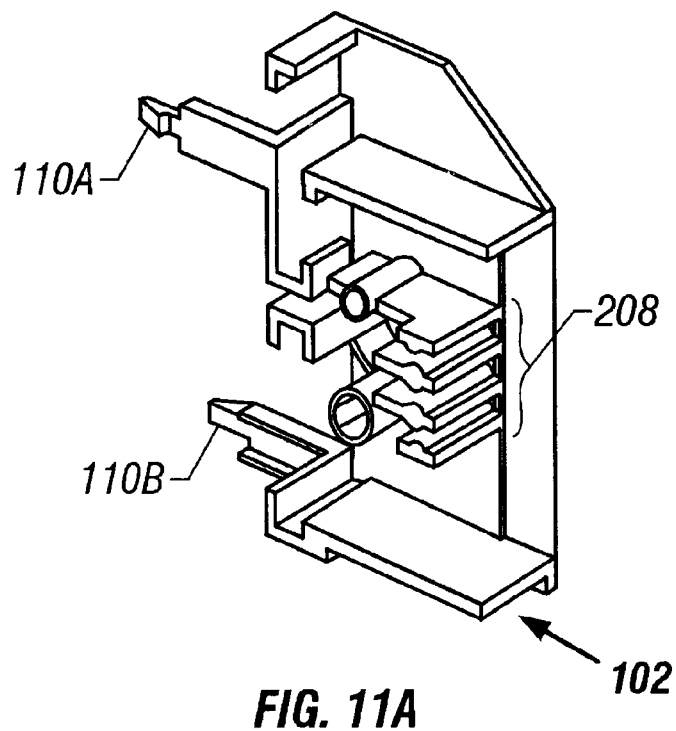
FIG. 11A–11F depict the various steps involved in assembling an exemplary modular circuit breaker housing assembly of the present invention, wherein a common line bus member is utilized in conjunction with common alarm contact members.
Figure 11B:
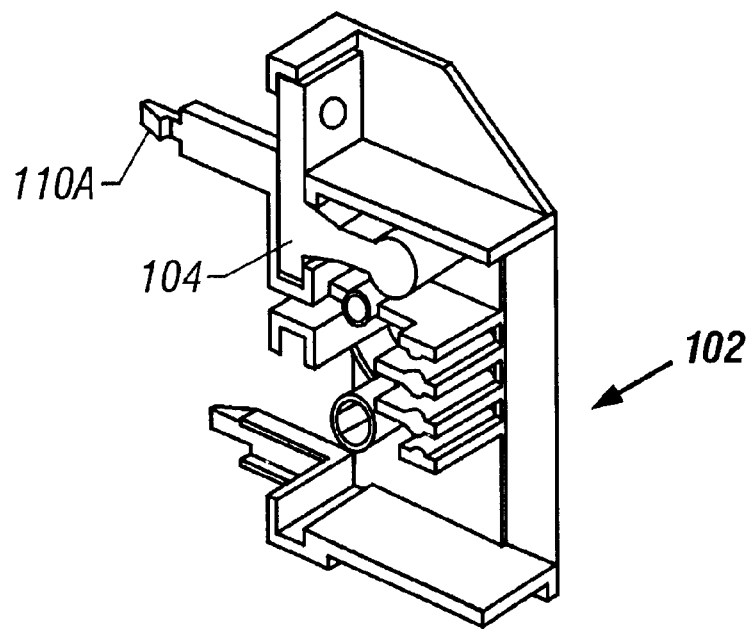
Figure 11C:
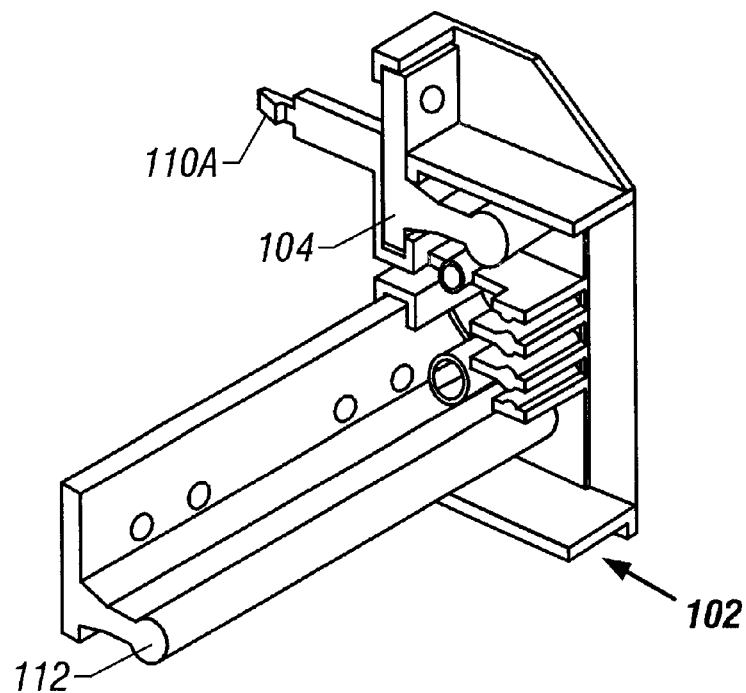
Figure 11D:
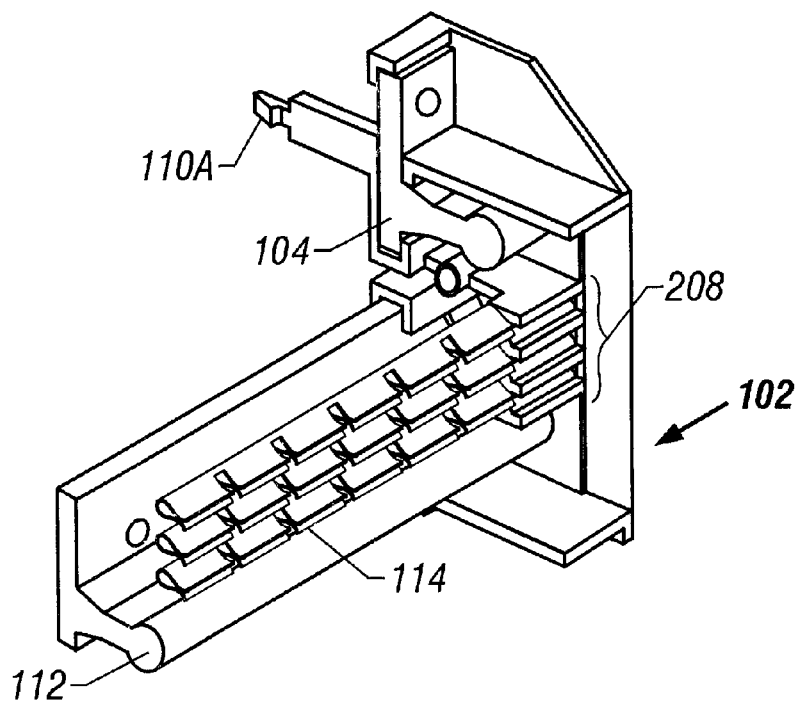
Figure 11E:
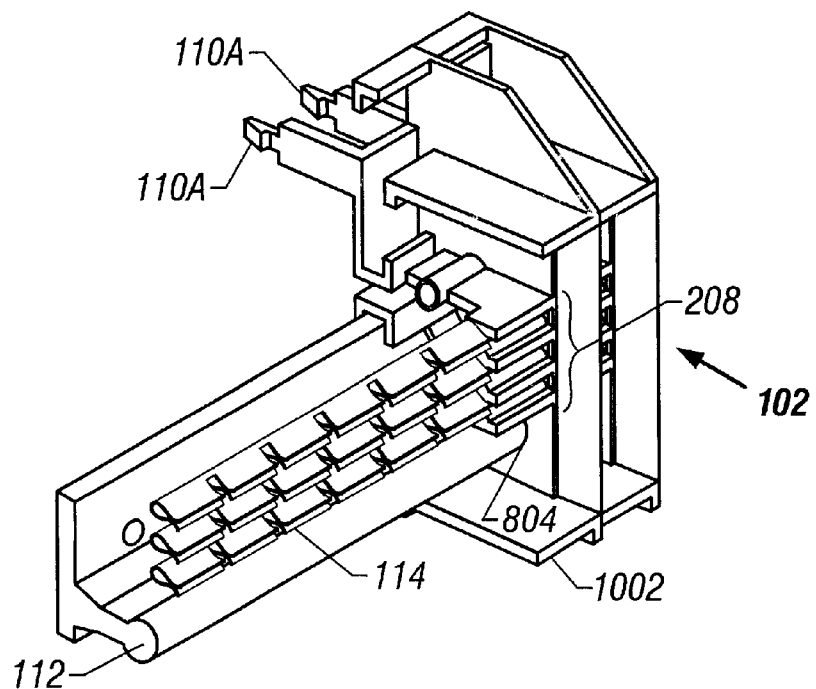
Figure 11F:
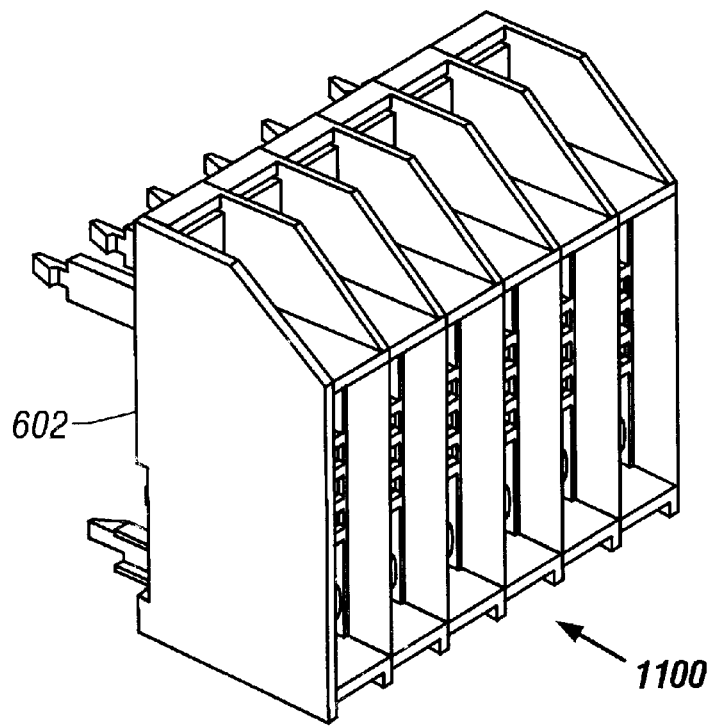

FIGS. 11A through 11F depict the various steps involved in assembling an exemplary modular circuit breaker housing assembly 1100 of the present invention wherein a common line bus bar 112 is utilized in conjunction with a plurality of common alarm contact members 114. It should be recognized by those skilled in the art that although the exemplary steps are set forth below in a specific sequence for the sake of clarity, no particular order thereof should be implied or is necessary for purposes of the present invention. After providing the exemplary end housing portion 102 (FIG. 11A), a load bus member 104 is installed in the load bus chamber of the exemplary end housing portion 102 (FIG. 11B). Thereafter, the common line bus bar 112 is installed such that one of its ends is disposed in the line bus chamber of the end housing portion 102 (FIG. 11C). The common alarm contact members 114 are inserted into the alarm contact receptacles 208 formed interiorly to the end housing portion 102 (FIG. 11D). An individual housing portion 1002 is then installed such that the pass-through slot thereof accommodates the common line bus bar 112 and the pass-through apertures thereof allow the passage of the common alarm contact members 114 (FIG. 11E). The interlocking connectors of the individual housing portion engage the interlocking connector receptacles formed in the end housing portion 102. A load bus member is disposed in the load bus chamber of the individual housing portion 1002. Depending on the system requirements, as many individual housing portions as needed are then installed until the common line bus bar and alarm contact members are completely housed by the interlocking individual housing portions. An end panel portion 602 is then used to enclose the modular circuit breaker housing assembly 1100 by interlocking with the terminal individual housing portion (FIG. 11F).

Figure 12A:
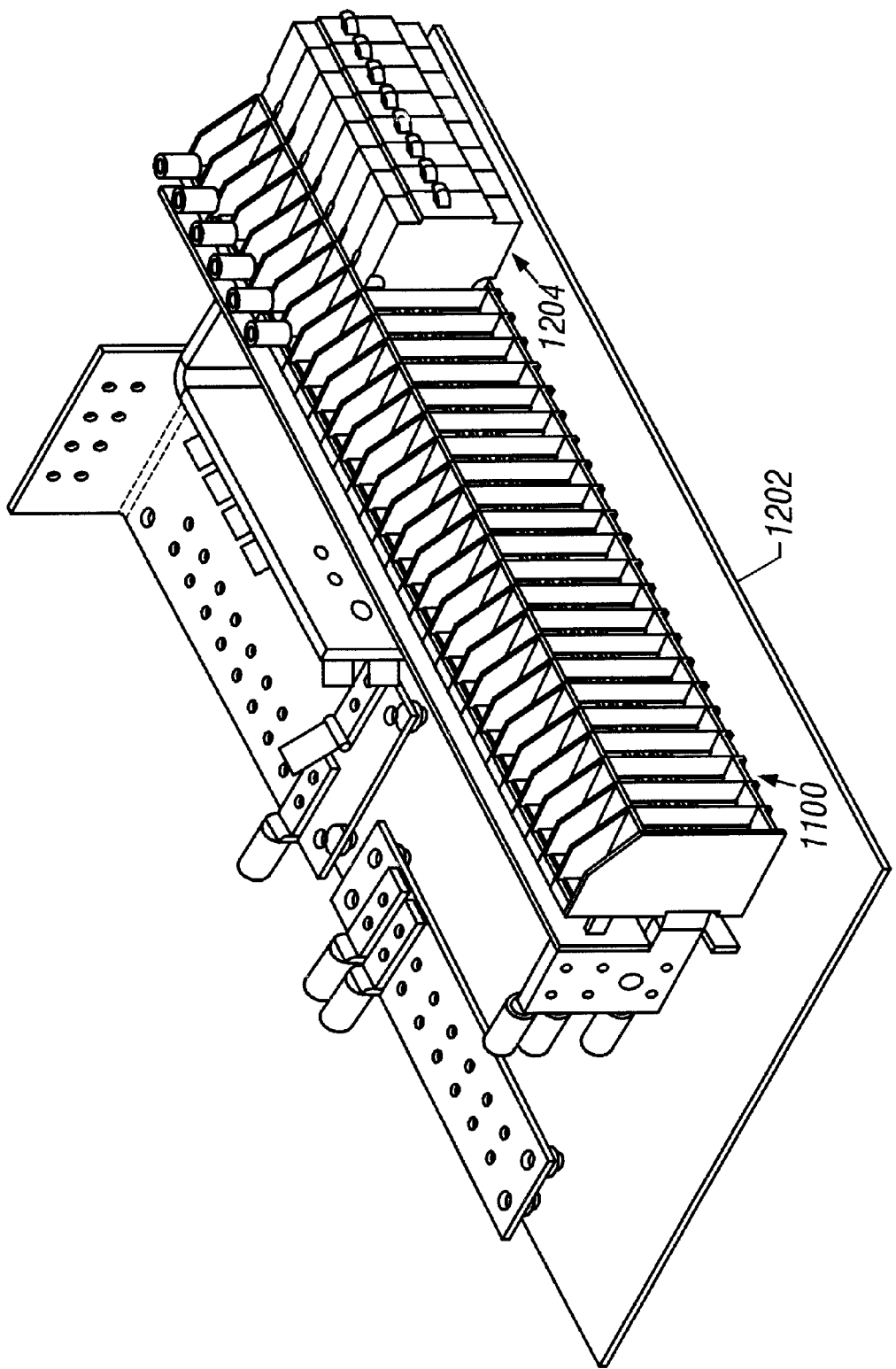
FIGS. 12A and 12B depict two views of an exemplary mounting panel to which the exemplary modular circuit breaker housing assembly of the present invention is mounted.
Figure 12B:
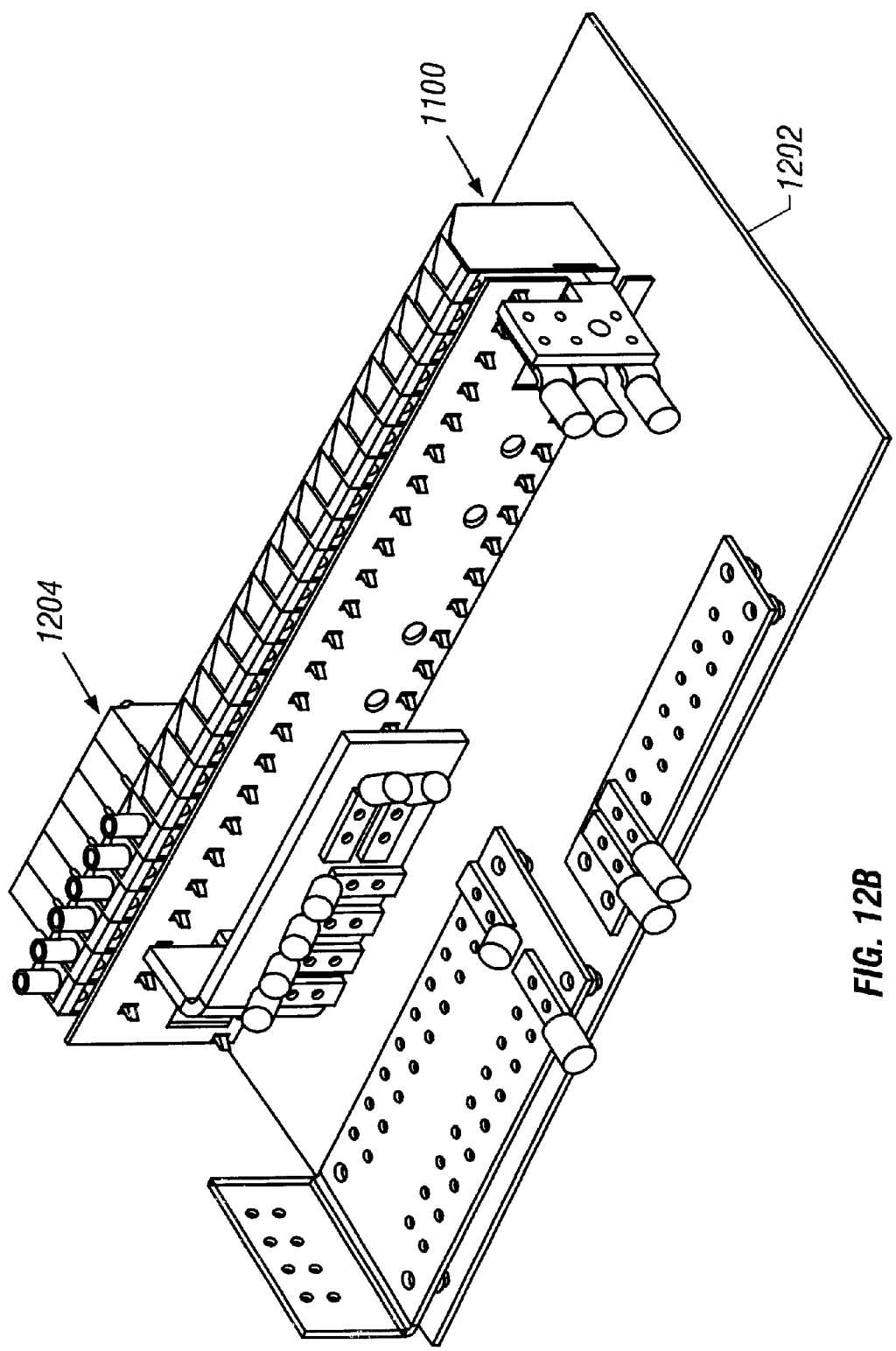
Figure 13A:
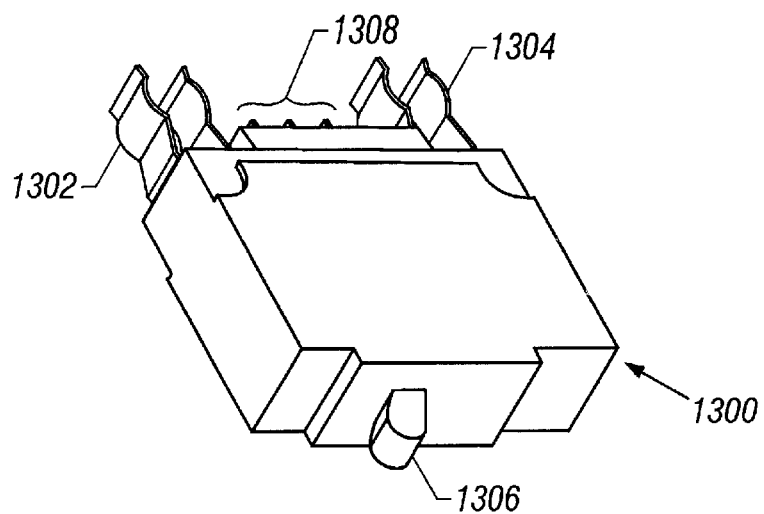
FIGS. 13A–13D depict several views of an exemplary circuit breaker with alarm contacts that is operable with the modular circuit breaker housing assembly of the present invention.
Figure 13B:
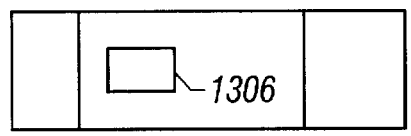
Figure 13C:
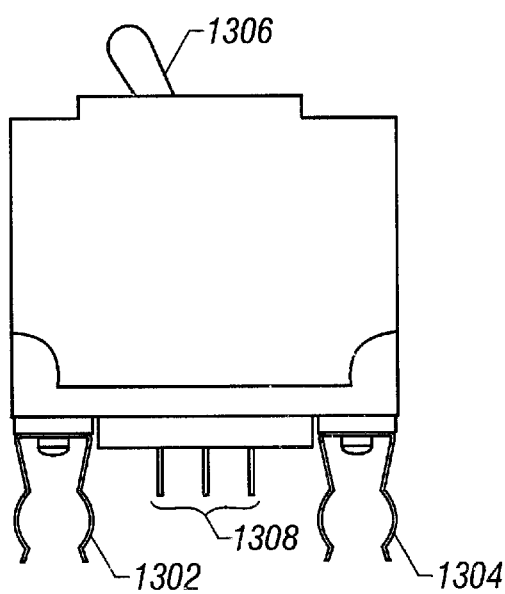
Figure 13D:
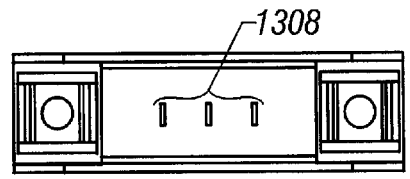

Referring now to FIGS. 12A and 12B, depicted therein are two views of an exemplary mounting panel 1202 to which the exemplary modular circuit breaker housing assembly 1100 of the present invention is mounted using the mounting devices provided therefor. A plurality of conventional circuit breakers 1204 are installed in the modular housing assembly. In a presently preferred exemplary embodiment of the present invention, the mounting panel 1202 is comprised of a sheet metal member forming a portion of the equipment cabinet or a chassis, and the like.

FIGS. 13A through 13D depict several views of an exemplary circuit breaker 1300 with alarm contact pins 1308 that is operable with the modular circuit breaker housing assembly of the present invention. When the circuit breaker 1300 is installed, first and second clasping contacts 1302, 1303 engage the load and line bus members of the modular circuit breaker housing assembly. In similar fashion, the alarm contact pins 1308 are engaged by the alarm contact members of the modular circuit breaker housing assembly. A throw switch 1306 is conventionally provided for operating the circuit breaker 1300.

Based on the foregoing, those skilled in the art should recognize that the present invention's modular circuit breaker housing assembly offers several advantages while overcoming the deficiencies and shortcomings of the state-of-the-art solutions. First, in practicing the present invention in accordance with the teachings contained herein, no expensive equipment or manufacturing processes are necessary or need to be developed. The preferred design of the circuit breaker housing assembly of the present invention reverses the "line" and "load" contacts in the conventional circuit breaker housing modules, thereby eliminating the need to route outgoing power around the common bus to the top of the module housing as is needed in the current modules. This innovative feature of the present invention's circuit breaker housing assembly yields a compact form factor which reduces the cost of manufacture as well as satisfies the stringent space requirements of today's densely populated rack designs of the telecom equipment.

The common line bus bar and load bus members are preferably manufactured from a single extruded material, simply cut to different lengths depending on the number of individual housing modules to be grouped. Also, the common line bus bar of one modular circuit breaker housing assembly (comprising a group of individual housing modules) can be jumpered to the common bus of another group of individual housing modules either during assembly or as an in-the-field upgrade. As pointed out in the Background section of the present patent application, such advantageous features are not available in the current products.

The interlocking design of the present invention simplifies assembly, eliminates the need for additional hardware, and allows custom configurations such as, for example, different quantities in circuit breaker groups or different alarm requirements, et cetera. These advantageous features are also not available in current circuit breaker housing modules.

Furthermore, the "snap-in" mounting feature described hereinabove in reference to the presently preferred exemplary embodiments of the present invention also simplifies assembly and requires no additional hardware, unlike the current products.

It is believed that the operation and construction of the present invention will be apparent from the foregoing Detailed Description. While the apparatus and assembly shown and described have been characterized as being preferred, it should be readily understood that various changes, modifications and enhancements could be made therein without departing from the scope of the present invention as set forth in the following claims. For example, although the preferred exemplary embodiments have been described in the context of telecom equipment with DC circuit breakers, it should be realized by those skilled in the art upon reference hereto that the teachings of the present invention may be advantageously practiced in fabricating circuit breaker housings for residential, light industrial, and commercial AC circuit breaker applications as well. In addition, the use of mounting snaps is exemplary rather than a limitation. As alluded to hereinabove, various mounting devices such as screws, rivets, bolts, clasps, fasteners, hooks, clips, braces, grips, clamps, buckles, buttons, etc. may be utilized for mounting the modular circuit breaker assembly of the present invention. Moreover, line and load bus members of various relative sizes, shapes, and cross-sections may be used in the practice of the present invention. Accordingly, all such variations, combinations, modifications, additions, arrangements, enhancements, etc. are within the ambit of the present invention whose scope is solely defined by the claims set forth hereinbelow.

What is claimed is:

1. A modular circuit breaker housing assembly, comprising:

an end housing portion having a load bus chamber and a line bus chamber interior thereto, said load bus and line bus chambers for receiving load and line bus members, respectively;

at least one alarm contact member receptacle formed in said end housing portion for receiving an alarm contact member;

at least one interlocking connector receptacle formed on said end housing portion for receiving an interlocking connector member;

an end panel portion having at least one interlocking connector member formed thereon, said at least one interlocking connector member being operable to be coupled with at least said at least one interlocking connector receptacle;

at least one individual housing portion having an individual load bus chamber for receiving an individual load bus member, a line bus chamber for receiving an individual line bus member, and at least one alarm contact member receptacle for receiving an alarm contact member;

at least one interlocking connector receptacle formed on one side of said at least one individual housing portion for receiving an interlocking connector member formed on one of said end panel portion and a next individual housing portion;

at least one interlocking connector member formed on an opposite side of said at least one individual housing portion, said at least one interlocking connector member operating to interlock with said at least one interlocking connector receptacle formed on one of said end housing portion and a previous individual housing portion;

said at least one interlocking connector receptacle formed on said end housing portion comprises two gripper bosses, and further wherein said at least one interlocking connector member formed on said end panel portion and said at least one individual housing portion comprises two gripper pins;

wherein said end housing portion and said at least one individual housing portion includes a mounting device for mounting said modular circuit breaker assembly to a mounting panel; and wherein said individual line bus members comprise a single, elongated common line bus bar, and further wherein each individual housing portion includes a pass-through slot for accepting said common line bus bar.

2. A modular circuit breaker housing assembly, comprising:

an end housing portion having a load bus chamber and a line bus chamber interior thereto, said load bus and line bus chambers for receiving load and line bus members, respectively;

at least one alarm contact member receptacle formed in said end housing portion for receiving an alarm contact member;

at least one interlocking connector receptacle formed on said end housing portion for receiving an interlocking connector member;

an end panel portion having at least one interlocking connector member formed thereon, said at least one interlocking connector member being operable to be coupled with at least said at least one interlocking connector receptacle;

at least one individual housing portion having an individual load bus chamber for receiving an individual load bus member, a line bus chamber for receiving an individual line bus member, and at least one alarm contact member receptacle for receiving an alarm contact member;

at least one interlocking connector receptacle formed on one side of said at least one individual housing portion for receiving an interlocking connector member formed on one of said end panel portion and a next individual housing portion;

at least one interlocking connector member formed on an opposite side of said at least one individual housing portion, said at least one interlocking connector member operating to interlock with said at least one interlocking connector receptacle formed on one of said end housing portion and a previous individual housing portion;

said at least one interlocking connector receptacle formed on said end housing portion comprises two gripper bosses, and further wherein said at least one interlocking connector member formed on said end panel portion and said at least one individual housing portion comprises two gripper pins;

wherein said end housing portion and said at least one individual housing portion includes a mounting device for mounting said modular circuit breaker assembly to a mounting panel; and wherein said alarm contact member is comprised of a single common alarm contact member, and further wherein each individual housing portion includes at least one pass-through aperture for allowing said common alarm contact member to span said modular circuit breaker housing assembly.

3. A modular circuit breaker housing assembly, comprising:

an end housing portion having a load bus chamber and a line bus chamber interior thereto, said load bus and line bus chambers for receiving load and line bus members, respectively;

at least one alarm contact member receptacle formed in said end housing portion for receiving an alarm contact member;

at least one interlocking connector receptacle formed on said end housing portion for receiving an interlocking connector member;

an end panel portion having at least one interlocking connector member formed thereon, said at least one interlocking connector member being operable to be coupled with at least said at least one interlocking connector receptacle;

at least one individual housing portion having an individual load bus chamber for receiving an individual load bus member, a line bus chamber for receiving an individual line bus member, and at least one alarm contact member receptacle for receiving an alarm contact member;

at least one interlocking connector receptacle formed on one side of said at least one individual housing portion for receiving an interlocking connector member formed on one of said end panel portion and a next individual housing portion;

at least one interlocking connector member formed on an opposite side of said at least one individual housing portion, said at least one interlocking connector member operating to interlock with said at least one interlocking connector receptacle formed on one of said end housing portion and a previous individual housing portion;

said at least one interlocking connector receptacle formed on said end housing portion comprises two gripper bosses, and further wherein said at least one interlocking connector member formed on said end panel portion and said at least one individual housing portion comprises two gripper pins;

wherein said end housing portion and said at least one individual housing portion includes a mounting device for mounting said modular circuit breaker assembly to a mounting panel; and wherein said load bus and line bus members are formed of extruded copper bars having substantially the same cross-sectional surface.

4. A modular circuit breaker housing assembly, comprising:

an end housing portion having a load bus chamber and a line bus chamber interior thereto, said load bus and line bus chambers for receiving load and line bus members, respectively;

at least one alarm contact member receptacle formed in said end housing portion for receiving an alarm contact member;

at least one interlocking connector receptacle formed on said end housing portion for receiving an interlocking connector member;

an end panel portion having at least one interlocking connector member formed thereon, said at least one interlocking connector member being operable to be coupled with at least said at least one interlocking connector receptacle;

at least one individual housing portion having an individual load bus chamber for receiving an individual load bus member, a line bus chamber for receiving an individual line bus member, and at least one alarm contact member receptacle for receiving an alarm contact member;

at least one interlocking connector receptacle formed on one side of said at least one individual housing portion for receiving an interlocking connector member formed on one of said end panel portion and a next individual housing portion;

at least one interlocking connector member formed on an opposite side of said at least one individual housing portion, said at least one interlocking connector member operating to interlock with said at least one interlocking connector receptacle formed on one of said end housing portion and a previous individual housing portion;

said at least one interlocking connector receptacle formed on said end housing portion comprises two gripper bosses, and further wherein said at least one interlocking connector member formed on said end panel portion and said at least one individual housing portion comprises two gripper pins;

wherein said end housing portion and said at least one individual housing portion includes a mounting device for mounting said modular circuit breaker assembly to a mounting panel; and wherein said load bus and line bus members are formed of extruded aluminum bars with nickel plating, said bars having substantially the same cross-sectional surface.

5. A modular circuit breaker housing assembly, comprising:

an end housing portion having a load bus chamber and a line bus chamber interior thereto, said load bus and line bus chambers for receiving load and line bus members, respectively;

at least one alarm contact member receptacle formed in said end housing portion for receiving an alarm contact member;

at least one interlocking connector receptacle formed on said end housing portion for receiving an interlocking connector member;

an end panel portion having at least one interlocking connector member formed thereon, said at least one interlocking connector member being operable to be coupled with at least said at least one interlocking connector receptacle;

at least one individual housing portion having an individual load bus chamber for receiving an individual load bus member, a line bus chamber for receiving an individual line bus member, and at least one alarm contact member receptacle for receiving an alarm contact member;

at least one interlocking connector receptacle formed on one side of said at least one individual housing portion for receiving an interlocking connector member formed on one of said end panel portion and a next individual housing portion;

at least one interlocking connector member formed on an opposite side of said at least one individual housing portion, said at least one interlocking connector member operating to interlock with said at least one interlocking connector receptacle formed on one of said end housing portion and a previous individual housing portion;

said at least one interlocking connector receptacle formed on said end housing portion comprises two gripper bosses, and further wherein said at least one interlocking connector member formed on said end panel portion and said at least one individual housing portion comprises two gripper pins;

wherein said end housing portion and said at least one individual housing portion includes a mounting device for mounting said modular circuit breaker assembly to a mounting panel; and wherein said load bus and line bus members are formed of extruded metallic bars having at least one via formed therein, said at least one via formed in said load bus member being operable for attaching a cable to carry load current and said at least one via formed in said line bus member being operable for a jumper attachment with another modular circuit breaker housing assembly.

6. A customizable modular circuit breaker housing assembly for telecommunications equipment, comprising:

an end housing portion having interior thereto a load bus chamber and a line bus chamber, said load bus and line bus chambers for respectively receiving load and line bus members having substantially the same cross-sectional surface, said end housing portion having at least one interlocking receptacle formed therein;

a plurality of individual housing portions interlocking with each other by means of interlocking connectors and interlocking connector receptacles formed on each individual housing portion, each individual housing portion having individual load bus and line bus chambers for placing load and line bus members, respectively, wherein a first terminal individual housing portion couples to said end housing portion;

an end panel portion having at least one interlocking member formed thereon, said at least one interlocking member being operable to be coupled with at least one of said interlocking connector receptacles formed on a second terminal individual housing portion of said plurality of individual housing portions; and wherein said line bus members comprise a single common line bus bar, and further wherein each of said individual housing portions includes a pass-through slot formed therein such that said single common line bus bar is operable to be inserted through said slot of each individual housing portion.

7. A customizable modular circuit breaker housing assembly for telecommunications equipment, comprising;

an end housing portion having interior thereto a load bus chamber and a line bus chamber, said load bus and line bus chambers for respectively receiving load and line bus members having substantially the same cross-sectional surface, said end housing portion having at least one interlocking receptacle formed therein;

a plurality of individual housing portions interlocking with each other by means of interlocking connectors and interlocking connector receptacles formed on each individual housing portion, each individual housing portion having individual load bus and line bus chambers for placing load and line bus members, respectively, wherein a first terminal individual housing portion couples to said end housing portion;

an end panel portion having at least one interlocking member formed thereon, said at least one interlocking member being operable to be coupled with at least one of said interlocking connector receptacles formed on a second terminal individual housing portion of said plurality of individual housing portions; and wherein said end housing portion and said plurality of individual housing portions further include at least one contact member receptacle for receiving an alarm contact member, and further wherein each of said individual housing portions includes at least one pass-through aperture formed therein such that said alarm contact member comprises a single common alarm contact member operable to be inserted through said at least one pass-through aperture of each individual housing portion.

8. A customizable modular circuit breaker housing assembly for telecommunications equipment, comprising:

an end housing portion having interior thereto a load bus chamber and a line bus chamber, said load bus and line bus chambers for respectively receiving load and line bus members having substantially the same cross-sectional surface, said end housing portion having at least one interlocking receptacle formed therein;

a plurality of individual housing portions interlocking with each other by means of interlocking connectors and interlocking connector receptacles formed on each individual housing portion, each individual housing portion having individual load bus and line bus chambers for placing load and line bus members, respectively, wherein a first terminal individual housing portion couples to said end housing portion;

an end panel portion having at least one interlocking member formed thereon, said at least one interlocking member being operable to be coupled with at least one of said interlocking connector receptacles formed on a second terminal individual housing portion of said plurality of individual housing portions; and wherein said load bus and line bus members are formed of extruded copper bars.

9. A customizable modular circuit breaker housing assembly for telecommunications equipment, comprising:

an end housing portion having interior thereto a load bus chamber and a line bus chamber, said load bus and line bus chambers for respectively receiving load and line bus members having substantially the same cross-sectional surface, said end housing portion having at least one interlocking receptacle formed therein;

a plurality of individual housing portions interlocking with each other by means of interlocking connectors and interlocking connector receptacles formed on each individual housing portion, each individual housing portion having individual load bus and line bus chambers for placing load and line bus members, respectively, wherein a first terminal individual housing portion couples to said end housing portion;

an end panel portion having at least one interlocking member formed thereon, said at least one interlocking member being operable to be coupled with at least one of said interlocking connector receptacles formed on a second terminal individual housing portion of said plurality of individual housing portions; and wherein said load bus and line bus members are formed of extruded aluminum bars having a nickel plating.

10. A customizable nodular circuit breaker housing assembly for telecommunications equipment, comprising;

an end housing portion having interior thereto a load bus chamber and a line bus chamber, said load bus and line bus chambers for respectively receiving load and line bus members having substantially the same cross-sectional surface, said end housing portion having at least one interlocking receptacle formed therein;

a plurality of individual housing portions interlocking with each other by means of interlocking connectors and interlocking connector receptacles formed on each individual housing portion, each individual housing portion having individual load bus and line bus chambers for placing load and line bus members, respectively, wherein a first terminal individual housing portion couples to said end housing portion;

an end panel portion having at least one interlocking member formed thereon, said at least one interlocking member being operable to be coupled with at least one of said interlocking connector receptacles formed on a second terminal individual housing portion of said plurality of individual housing portions; and wherein said load bus and line bus members are formed of extruded metallic bars having at least one via formed therein, said at least one via formed in said load bus member being operable for attaching a cable to carry load current and said at least one via formed in said line bus member being operable for a jumper attachment with another customizable modular circuit breaker housing assembly.

11. A method of assembling a customizable modular circuit breaker housing assembly for telecommunications equipment, comprising the steps of:

providing an end housing portion having interior thereto a load bus chamber and a line bus chamber, said end housing portion having at least one interlocking receptacle formed therein;

installing a load bus member and a common line bus bar in said end housing portion;

installing at least one common alarm contact member in said end housing portion;

installing a plurality of individual housing portions interlocking with each other by means of interlocking connectors and interlocking connector receptacles formed on each individual housing portion, each individual housing portion having an individual load bus chamber for placing an individual load bus member therein and a line bus chamber with a pass-through slot for placing said common line bus bar, said individual housing portions further including at least one pass-through aperture for accepting said at least one common alarm contact member, wherein a first terminal individual housing portion couples to said end housing portion; and coupling an end panel portion having at least one interlocking member formed thereon to a second terminal individual housing portion of said plurality of individual housing portions.

12. The method of assembling a customizable modular circuit breaker housing assembly for telecommunications equipment as set forth in claim 11, wherein said end housing portion, said plurality of individual housing portions, and said end panel portion are formed of injection-molded plastics.

13. The method of assembling a customizable modular circuit breaker housing assembly for telecommunications equipment as set forth in claim 11, wherein said load bus members and said common line bus bar are formed of extruded metallic bars having substantially the same cross-sectional surface.

14. The method of assembling a customizable modular circuit breaker housing assembly for telecommunications equipment as set forth in claim 13, wherein said load bus members and said common line bus bar include at least one via formed therein, said at least one via formed in said load bus members being operable for attaching a cable to carry load current and said at least one via formed in said line bus bar being operable for a jumper attachment with another customizable modular circuit breaker housing assembly.

* * * * *